United States Patent [19]

Gandolfo

[11] Patent Number: 4,636,271

[45] Date of Patent: Jan. 13, 1987

[54] FORMING A WIRE MARKER SLEEVE

[75] Inventor: Paul J. Gandolfo, Parsippany, N.J.

[73] Assignee: Thomas & Betts Corporation, Raritan, N.J.

[21] Appl. No.: 699,775

[22] Filed: Feb. 8, 1985

[51] Int. Cl.$^4$ .................. B29C 53/20; B32B 31/02
[52] U.S. Cl. ................... 156/73.1; 40/316; 174/DIG. 8; 156/86; 156/198; 156/244.13; 156/290; 156/306.3; 156/308.4; 156/344; 428/36
[58] Field of Search ............ 264/23, 230, 248, 150; 156/73.1, 198, 52, 86, 344, 244.13, 290, 306.3, 308.4; 40/316; 428/36; 53/585; 403/2; 174/DIG. 8

[56] References Cited

U.S. PATENT DOCUMENTS

| | | | |
|---|---|---|---|
| 2,043,070 | 6/1936 | Rutkowski | 206/79 |
| 2,058,542 | 10/1936 | Wise | 206/79 |
| 2,161,561 | 6/1939 | Dalton | 156/86 |
| 3,086,242 | 4/1963 | Cook et al. | 18/1 |
| 3,212,207 | 10/1965 | Searing | 40/316 |
| 3,226,285 | 12/1965 | Iorenko | 156/198 |
| 3,468,731 | 9/1969 | Obeda | 264/248 |
| 3,542,618 | 11/1970 | DeVaughn | 264/150 |
| 3,894,731 | 7/1975 | Evans | 269/47 |
| 3,985,852 | 10/1976 | Evans | 264/132 |
| 4,032,010 | 6/1977 | Evans | 206/345 |
| 4,087,301 | 5/1978 | Steadman | 156/198 |
| 4,191,405 | 3/1980 | Johnstun | 282/28 |
| 4,293,364 | 10/1981 | Fujio | 156/344 |
| 4,361,230 | 11/1982 | Downing | 206/345 |
| 4,363,401 | 12/1982 | Savagian | 206/345 |
| 4,365,400 | 12/1982 | Carlomagno | 29/235 |
| 4,425,390 | 1/1984 | Changani et al. | 428/43 |
| 4,442,939 | 4/1984 | Downing | 206/345 |
| 4,451,965 | 6/1984 | Carlomagno | 29/450 |
| 4,461,793 | 7/1984 | Blok et al. | 428/36 |

FOREIGN PATENT DOCUMENTS 1332078  5/1962  France ................ 428/36

*Primary Examiner*—James Lowe
*Attorney, Agent, or Firm*—Robert M. Rodrick; Salvatore J. Abbruzzese

[57] ABSTRACT

A tubular wire marker sleeve is disclosed. The sleeve includes a central portion which is flattened by ultrasonic welding to form a releasable bond and end extents which are unflattened facilitating insertion of an electrical wire into the sleeve. Plural sleeves may be assembled on a support card for printing on the sleeve with a conventional typewriter or computer printer.

16 Claims, 8 Drawing Figures

FORMING A WIRE MARKER SLEEVE

FIELD OF THE INVENTION

This invention relates generally to a method of making a sleeve used to identify electrical wire and more particularly to a method of forming a wire marker sleeve having a flattened central extent to accommodate printed indicia.

BACKGROUND OF THE INVENTION

The use of indicia bearing sleeves placed over the ends of electrical wire or cable for identification purposes is long known in the art. Sleeves of this type may be of the heat shrinkable or non-heat shrinkable variety depending on the various needs of the end user. Heat shrinkable sleeves are made from a material that when subjected to heat will shrink around the wire or cable and bond thereto. Non-heat shrinkable sleeves are slipped over the wire and may include an adhesive inner coating to adhere the sleeve to the wire. The sleeves may be either preprinted, that is have indicia or color coding printed thereon by the manufacturer or may be blank wherein the end user prints the desired indicia thereon. The latter has more versatility to the end user in that any desired indicia may be placed on the sleeve at an on-site location.

Wire marker sleeves of the prior art are usually formed by one of two practices. The first includes forming the wire marker sleeve from a continuous length of extruded plastic tubing which then may be cut to the desired sleeve length. Again, these plastic tubular sleeves may be supplied to the user either preprinted or without printing. When supplied without printing, the sleeves are usually flattened to permit the user to print alpha-numeric indicia thereon. However, to provide printing capability, the flattened sleeves must be supported on a fixture or other device to facilitate movement through a printing device. In U.S. Pat. No. 3,894,731, issued July 15, 1975, flattened tubular sleeves are shown carried on a support carrier consisting of a plurality of pendent tines extending from a support spline. An assembly of this type however requires modified or special printing equipment not usually available to the end user.

A second technique is known for manufacturing wire marker sleeves which is compatible with office machinery such as a typewriter or a computer printer. This technique consists of placing two sheets of plastic film in side-by-side orientation forming a two-ply marker sheet. The two sheets are sealed together with spaced longitudinal seals to provide a three dimensional strucutre of elongate sleeves which the user can feed into a typewriter or computer printer. The printed sheets can be cut into individual wire markers for use over electrical wire. A wire marker system of this type requires extensive end user preparation in order to provide individual wire marker sleeves. The end user is responsible for spacing the indicia and cutting the elongate sleeves into individual wire markers. Further, the manufacture of wire marker sheets of this type is more complex as two sheets of material must be aligned and sealed along plural longitudinal lines in order to form the various wire markers.

An improvement in the latter technique for forming wire markers is shown in U.S. Pat. No. 4,361,230 issued Nov. 30, 1982. An assembly of wire marker sleeves is formed by joining one or more top webs to a base web of material along transverse seams. The top webs have a width which is narrower than the base web. The base web also includes a series of horizontal and vertical perforations to assist in detaching the individual wire markers from the assembly. While overcoming some of the disadvantages of the previous mentioned marker sheet, the assembly shown in the '230 patent still requires the joining of one or more top layers to a base layer to provide plural wire markers. One of the inherent disadvantages resulting from the formation of wire markers from one or more flat plies of material is that upon use of the individual marker sleeve, there is great difficulty in inserting the electrical wire in the end of the sleeve as the end tends to be closed due to the flat formation of the two-ply sheet. U.S. Pat. No. 4,442,939 issued Apr. 17, 1984, shows a sheet of wire markers formed from two plies of material wherein the region between adjacent wire markers includes an aperture through one sheet. Upon severence into individual wire markers, the portion of the aperture adjacent the end of the wire marker facilitates insertion of the wire into the sleeve. However placement of the apertures in one layer of the two-ply structure requires an additional step in manufacture which could increase the cost of assembly. Further, the user must search for the precise location of the aperture upon insertion of the wire in order to facilitate ease of insertion.

SUMMARY OF THE INVENTION

It is an object of the present invention to provide a method of making a wire marker sleeve from a length of hollow material.

It is a further object of the present invention to provide a method of making a wire marker sleeve having a flattened central extent and two unflattened end extents to facilitate insertion of the electrical wire therein.

It is a still further object of the present invention to provide a method of forming a wire marker sleeve assembly wherein a plurality of wire markers are mounted on a support card which can be inserted into a typewriter, computer printer, or similar printing mechanism.

In the efficient attainment of the foregoing and other objects the present invention looks toward providing a method of forming a wire marker sleeve including providing a hollow length of extruded plastic material severing the hollow length into wire marker lengths, flattening a central extent of one of the individual wire marker lengths and providing two end extents which are unflattened. The particular embodiment shown by way of description herein the central end extent is flattened by welding the central extent between two end extents thereby to provide a flattened area to accommodate printed indicia. The sleeves with the unflattened end extents are inserted into a support card which retentively accommodates a plurality of sleeves. The support card and the sleeves may be inserted in a typewriter or computer printer so that the flattened extents of the wire marker sleeve can accept printed indicia.

DETAILED DESCRIPTION OF THE PREFERRED EMBODIMENTS

1. Description of Wire Marker Tubing and Sleeves Made Therefrom.

Figure 1:
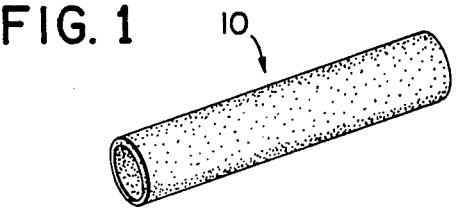
FIG. 1 is a perspective showing of a tubular wire marker sleeve of the present invention.

As shown in FIG. 1, wire marker sleeve 10 is a length of plastic material cut from a continuous length of tubing (not shown). As decribed herein, the wire marker tubing may be of the heat shrinkable or non-heat shrinkable variety. Each of these types of material are well-known in the wire marking art.

Examples of processees for forming the heat shrinkable wire marker tubing for example is shown in U.S. Pat. No. 3,086,242 issued Apr. 23, 1963. Briefly, this process employs a polymeric material which is extruded into a continuous tubular seamless profile. The tubular material is then cross-linked by either electron beam, irradiation or a chemically activated system. The cross-linked material is then thermally stabilized to establish its profile memory. The continuous tube is then expanded by reheating and chilling over a mandrel to yield an expanded tubular product. This expanded tubular product is then cut to the desired length necessary for wire markers. In prior art practices, the cut lengths may then be printed with appropriate indicia. An individual printed wire marker may then be inserted over an electrical wire and shrunk thereover by application of heat. For illustrative purposes, description herein will be made to this expanded tubular product, which after formation is heat shrunk down to its original profile over an electrical wire. However, it is contemplated that the present invention is also useful in forming non-heat-shrinkable wire markers.

2. Formation of the flattened central region.

Figure 2:
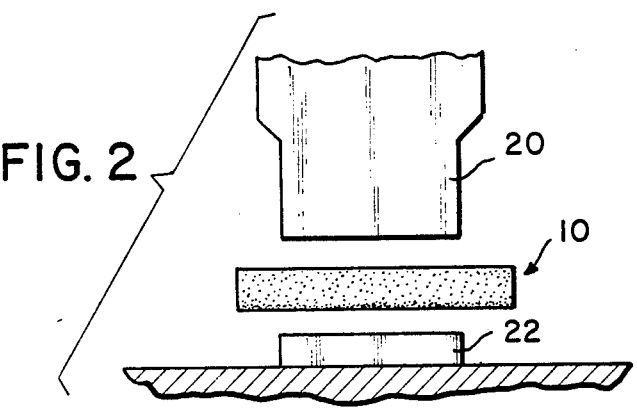
FIG. 2 shows the tubular wire marker sleeve of FIG. 1 inserted in an ultrasonic welder.
Figure 3:
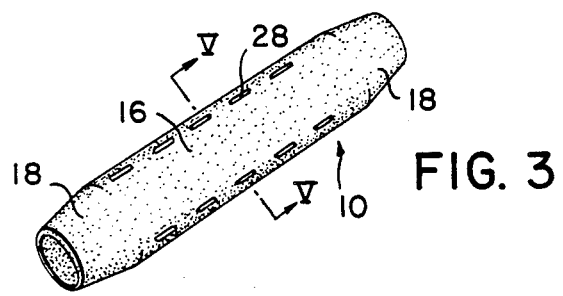
FIGS. 3 and 4 are perspective showings of the tubular wire marker sleeve flattened along a central portion by the ultrasonic welder.
Figure 4:
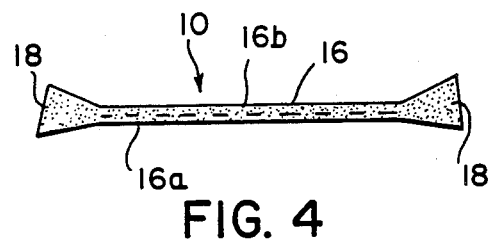
Figure 5:
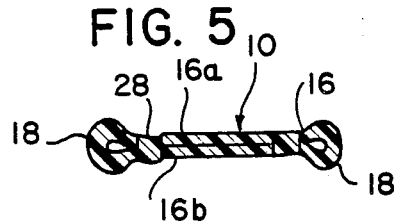
FIG. 5 is a sectional showing of the wire marker sleeve of FIG. 3 taken along the lines V—V.

An appropriate wire marker sleeve 10 (FIG. 1) is flattened along a central extent 16 in order to be accommodated in a typewriter or printer and to provide a suitable printing surface. As shown in FIG. 2, tubular sleeve 10 is positioned between a horn 20 and anvil 22 of a suitable ultrasonic welding device. The ultrasonic welding device is shown in FIG. 2 by way of schematic representatiion. The ultrasonic welding device may be any of a variety of commercially avabilable welding machines, such as model no. 150/70 sold by Sonibond Co. The horn 20 and anvil 22 configured to provide a flattened portion along the central extent 16 of tubular sleeve 10 (FIGS. 3 and 4). The horn 20 and anvil 22 are relatively movable to compress the central region 16 therebetween thereby forming a pair of opposed substantially planar surfaces 16a and 16b. Either of the horn 20 or anvil 22 includes a plurality of raised relief portions (not shown) along the longitudinal margins thereof. These raised relief portions provide welds 28, upon ultrasonic vibration, along the longitudinal edges of central portion 16. These welds 28 seal together the central portion 16 of tubular sleeve 10 by fusion, thereby providing the central flat profile (FIG. 5). As each end 18 of the tubular sleeve 10 extends beyond the horn 20 and anvil 22, the ends 18 remain substantially unflattened after ultrasonic welding of the central region maintaining a substantially tubular form.

Additionally, the raised relief portion of either horn 20 or anvil 22 may include a knurled pattern thereon to impart such pattern to one side of the welds 28 on central portion 16. This knurled pattern facilitates breaking of the welds 28 upon insertion of electrical wire into sleeve 10, as the raised knurled area provides only a light bond between the opposed flattened surfaces 16. Also, the raised knurled pattern provides traction to grip around the platen of a typewritter or similar device upon inserting a plurality of flattened markers 10 into a typewriter for placing indicia thereon as will be described in further detail hereinafter.

While conventional ultrasonic welding is used to flatten the central portion 16 of tubular sleeve 10 by placing a spaced series of welds 28 along each longitudinal edge thereof, this technique is shown only by way of example. Other conventional methods of forming sealed seams which would flatten the central portion 16 of tubular sleeve 10 may also be employed. Such techniques may include direct heat sealing, dielectric sealing as well as mechanical seaming techniques.

Further, as shown in FIG. 2, an individual tubular sleeve 10 is manually inserted between the horn 20 and anvil 22. However, it is also contemplated that an appropriate automatic fixture may be employed to repetitively feed a series of tubular sleeves 10 between horn 20 and anvil 22.

3. Assembly of Sleeves onto a Support Card.

Figure 6:
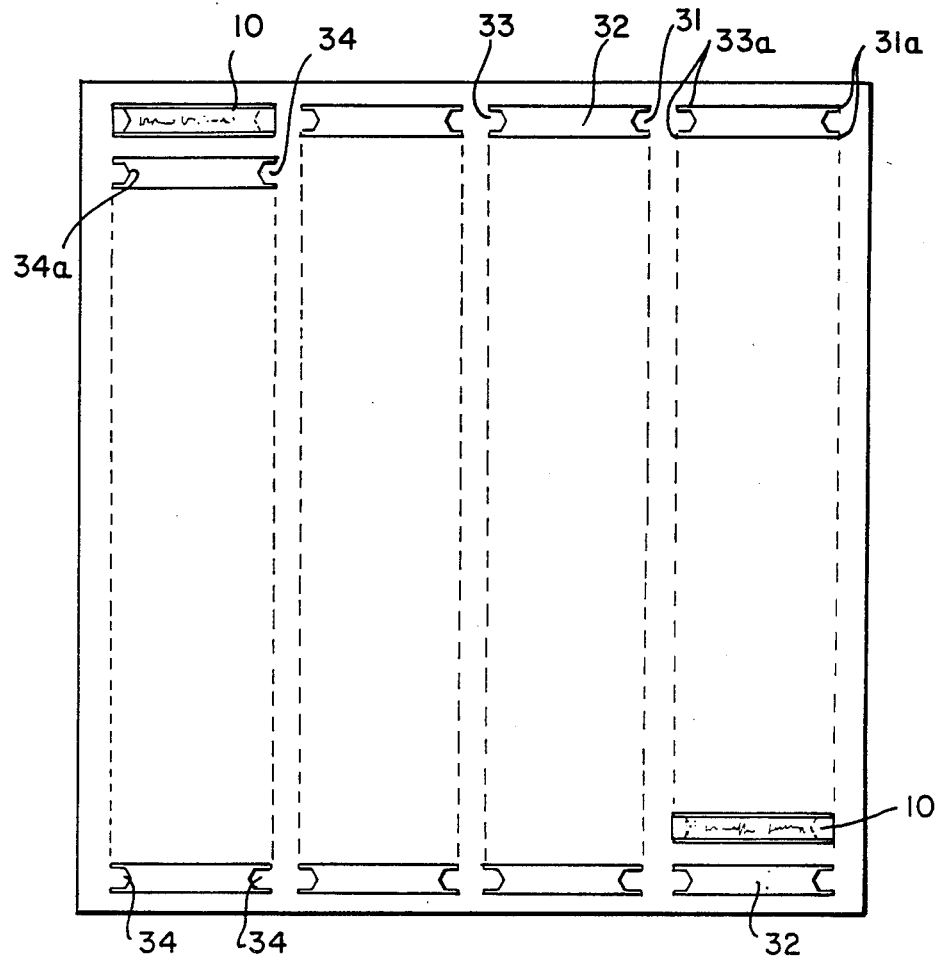
FIG. 6 shows a plurality of flattened wire marker sleeves assembled on a support card.

Referring to FIG. 6, a plurality of individual tubular sleeves 10 are shown mounted to a support card 30. Card 30 is a rectangular flat sheet of corrugated paperboard which is dimensioned to accommodate a predetermined number of tubular sleeves 10. Support card 30 is preferably formed in a single sheet, however, continous fan folded sheets are also contemplated. Each card 30 includes a plurality of die cut openings 32 arranged in a 4×10 matrix. Each of these openings is dimensioned to be slightly larger than tubular sleeve 10 to thereby retain an individual sleeve 10 therein.

Each opening 32 is defined by a pair of oppositely directed extending tabs 34 which protrude into opening 32. Tabs 34 extend from opposed outer marginal edges 31 and 33 of opening 32 forming thereat a pair of retaining slits 31a and 33a. Between slits 31a and 33a, tabs 34 extend inwardly to form a narrowing sleeve engaging surface 34a at the distal extents thereof. Tabs 34 are positioned and dimensioned to accommodate therebetween the individual tubular sleeves 10. The tabs 34 are inserted into the substantially tubular unflattened end portions 18 of tubular sleeve 10 with the marginal extents thereof retained in slits 31a and 33a. The sleeve 10 is thus frictionally retained on the support card 30 by tabs 34 with the central flattened portion 16 of tubular sleeve 10 lying in the central portion of opening 32. The tubular sleeves 10 may be inserted in openings 32 of support card 30 either manually or by use of an appropriate assembly tool.

4. Use of the Wire Marker Assembly and the Individual Sleeves.

The support card 30 shown in FIG. 6, including the mounted wire marker sleeves 10, may be inserted in a conventional typewriter or computer printer (not shown) for printing appropriate indicia on the flattened portion 16 of each of the individual tubular sleeves 10.

Each of the tubular sleeves 10 is inserted in the appropriate opening 32 of support card 30 so that the knurled portions of weldment 28 are displayed on one surface of the support card. This surface may be inserted against the platen of the typewriter or printing device so that the knurled surface provides additional traction for the support card 30 and tubular sleeves 10 in the typewriter. Once the desired indicia has been printed on the flat portion 16 of each of the tubular sleeves 10, the card may be removed from the typewriter or computer printer. The tubular sleeves may then be removed from the openings 32 of support card 30 for placement on an electrical wire.

Figure 7:
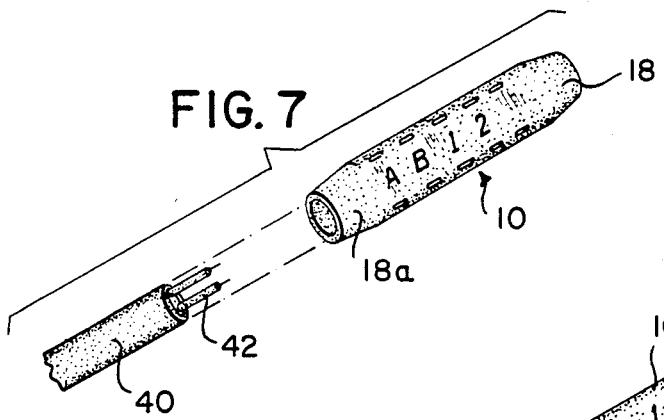
FIG. 7 shows the flattened printed wire marker sleeve adjacent the end of an electrical wire.
Figure 8:
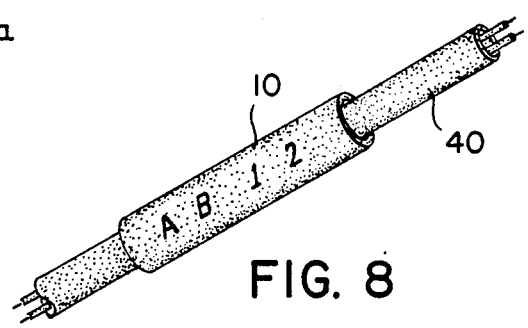
FIG. 8 shows a printed wire marker sleeve inserted over an end of an electrical wire.

As shown in FIG. 7, an electrical wire 40 may be inserted into a printed tubular sleeve 10. The wire which may have a bared end portion 42 can be easily slipped into the sleeve using either of the unflattened end 18 at one end of tubular sleeve 10. This unflattened end 18 provides a funnel entry to facilitate insertion. By holding the tubular sleeve 10 and progressively inserting wire 40, the welds 28 will be easily broken allowing the tubular sleeve 10 to be completely inserted over the wire 40. Once broken, the weld marks will eventually disappear. As shown in FIG. 8, the tubular sleeve 10 may be placed at its desired location along the length of wire 40. Once properly positioned, the tubular sleeve 10 may be heat shrunk around the wire 40 by appropriate application of heat.

While the above-described preferred embodiment contemplates use of a continuous seamless tube to form a wire marker sleeve having a flattened central portion and unflattened end portions, the sleeve need not be made from continuous tubing. Notwithstanding the aforementioned disadvantage of forming a sleeve from multi-ply webbing, the present invention may be practiced by using two or more webs of material which are seamed together to form a sleeve having a flattened central extent and unflattened end extents.

Various changes may be made to the foregoing without departing from the invention. The particularly described and illustrated preferred embodiment is thus intended in an illustrative and not in a limiting sense. The true scope of the invention is set forth in the following claims.

I claim:

1. A method of forming a wire marker sleeve comprising the steps of:
   providing an elongate hollow member; and
   releasably bonding a central extent of said hollow member intermediate the ends thereof to thereby provide a uniformly flattened portion and an unflattened end extent.

2. A method in accordance with claim 1, wherein said flattening step provides a pair of unflattened end extents.

3. A method in accordance with claim 2, wherein said providing step further comprises the steps of:
   providing a continuous length of seamless tubing; and;
   severing said elongate tubular member from said tubing.

4. A method in accordance with claim 3 wherein said bonding step further comprises:
   inserting said provided elongate tubular member between the dies of a sealing device;
   moving said dies into contact with said central extent of said tubular member; and
   sealably compressing said dies against said central extent of said tubular member.

5. A method in accordance with claim 4 wherein said sealing device is an ultrasonic welding machine.

6. A method in accordance with claim 5 further comprising the step of:
   placing a plurality of welds along the longitudinal sides of said central extent of said tubular member.

7. A method in accordance with claim 6 wherein said welds provide said releasable bond.

8. A method of forming a wire identification sleeve comprising the steps of:
   providing an elongate hollow member having a first wall portion and an opposed second wall portion; and
   flattening a central portion of said hollow member intermediate the ends thereof by releasably bonding said first wall portion to said second wall portion.

9. A method of claim 8 wherein said flattening steps further comprises:
   inserting said hollow member between a pair of dies having a longitudinal extent less than the length of said hollow member; and
   sealably compressing said hollow member between said pair of dies so that an extent at each end of said hollow member remains unflattened.

10. A method in accordance with claim 9 wherein said hollow member is an extent of hollow tubing.

11. A method in accordance with claim 10 wherein said providing step further comprises:
    extruding a continuous length of said tubing; and
    severing said extent of hollow tubing from said continous length.

12. A method in accordance with claim 11 wherein said compressing step further comprises ultrasonicly vibrating said dies to fuse said central extent flat.

13. A method in accordance with claim 12 further comprising:
    providing a plurality of longitudinally spaced ultrasonic welds on said central extent.

14. A method of forming a wire marker sleeve assembly comprising:
    forming a plurality of longitudinal wire marker sleeves having a releasably bonded central extent and unflattened end extents; and
    inserting each sleeve into one of a plurality of longitudinal openings in a support card, said support card having a pair of oppositely directed tabs adjacent each opening for supporting each sleeve.

15. A method in acccordance with claim 14 wherein said inserting step further comprises:
    inserting each said opposed tab of each said opening of said support card in the unflattened ends of said sleeve.

16. A method in accordance with claim 14 when said support card is a substantially flat planar member.

* * * * *